(No Model.) 3 Sheets—Sheet 1.

J. FARRELL.
HAY FORK AND CARRIER.

No. 273,350. Patented Mar. 6, 1883.

Witnesses:
Frank L. Ingersoll
Andrew H. Koukle

Inventor:
John Farrell (No Model.) 3 Sheets—Sheet 2.
J. FARRELL.
HAY FORK AND CARRIER.
No. 273,350. Patented Mar. 6, 1883.
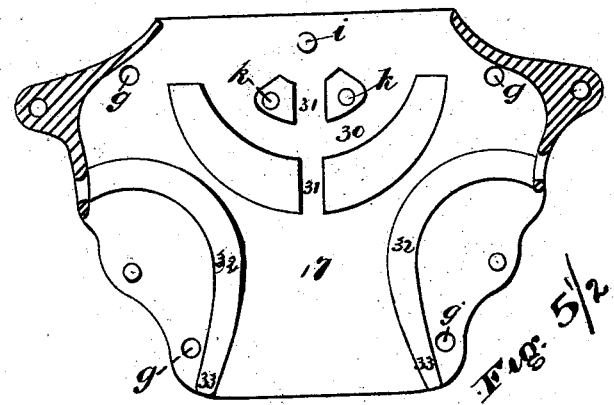
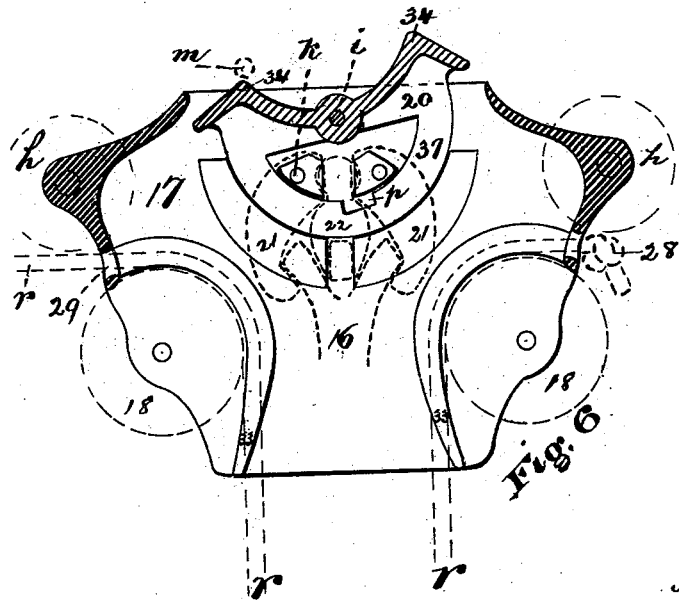
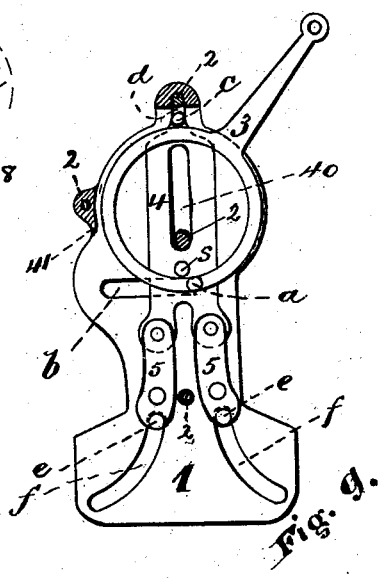
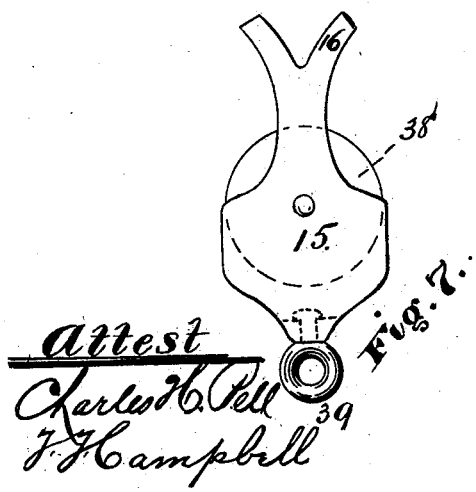
Attest
Charles H. Pell
J. H. Campbell
Inventor:
John Farrell,
by O. Drake, Atty

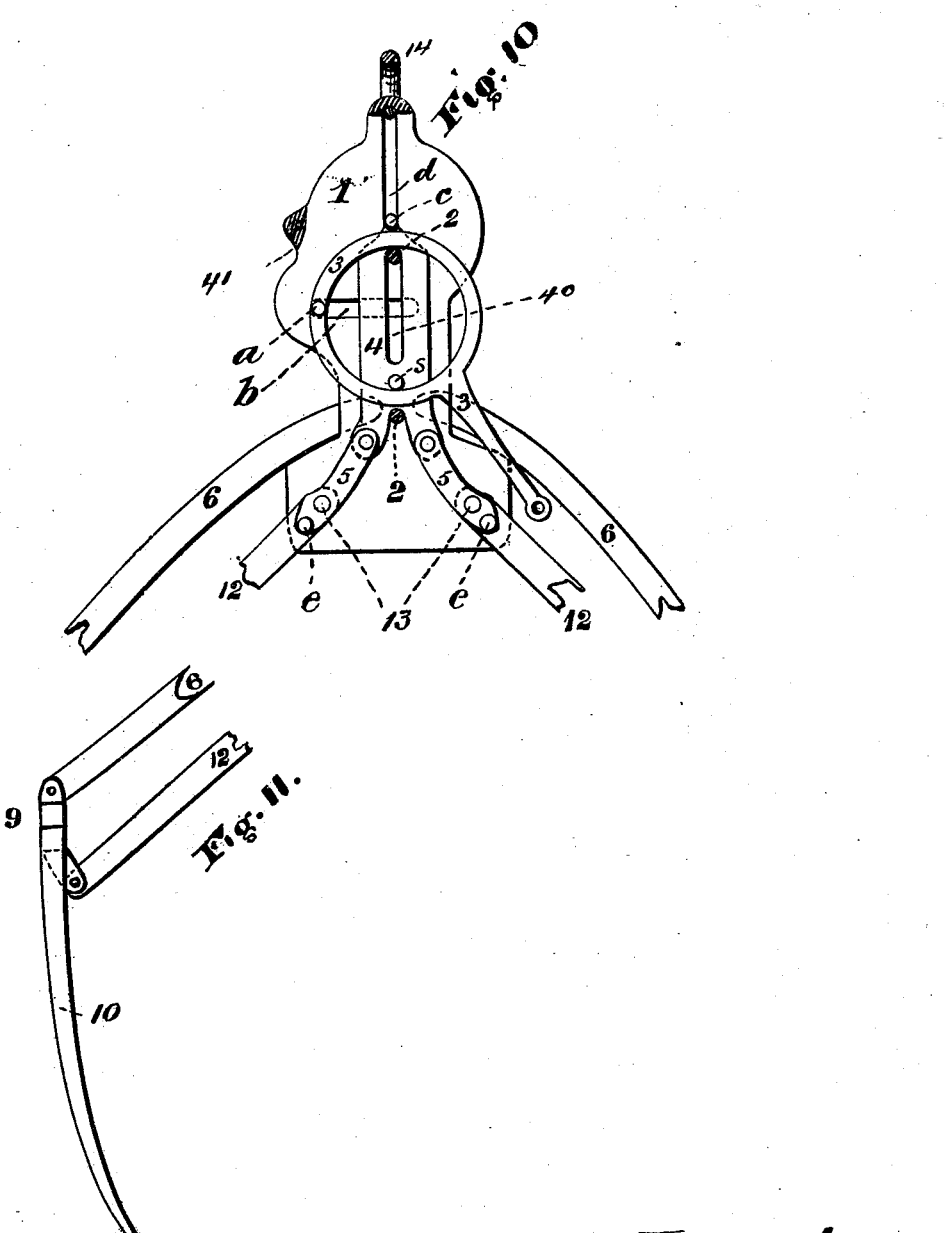

UNITED STATES PATENT OFFICE.

JOHN FARRELL, OF HUNTSVILLE, NEW JERSEY.

HAY FORK AND CARRIER.

SPECIFICATION forming part of Letters Patent No. 273,350, dated March 6, 1883.

Application filed September 27, 1882. (No model.)

*To all whom it may concern:*

Be it known that I, JOHN FARRELL, a citizen of the United States, residing at Huntsville, Sussex county, New Jersey, have invented certain new and useful Improvements in Hay Forks and Carriers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in hay forks and carriers adapted to be operated by horse-power, the object thereof being to render said forks and carriers less cumbersome, more certain in their operations, and to enable the carrier to travel in more than one direction from a central point without the inconvenience and trouble of climbing to the rafters or beams in the barn and reversing the position of the said carrier on the track. These objects are attained by means of the mechanism hereinafter described; and the invention consists in the arrangements and combinations of parts, substantially as will be fully set forth, and finally embodied in the claims.

Figure 1:
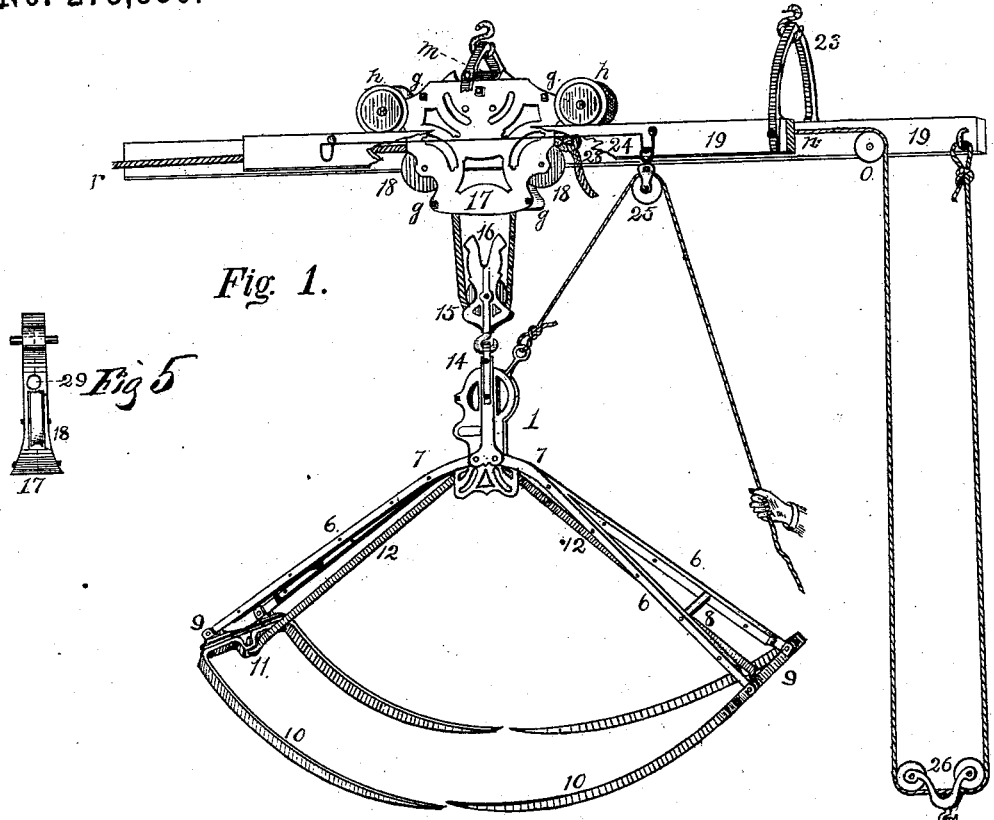
Figure 2:
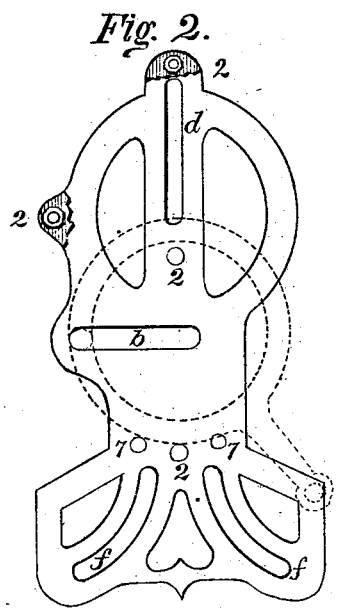
Figure 3:
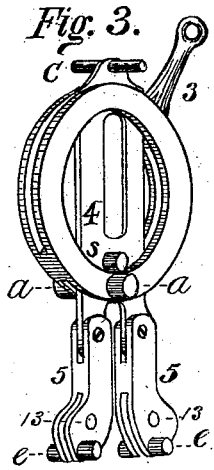
Figure 4:
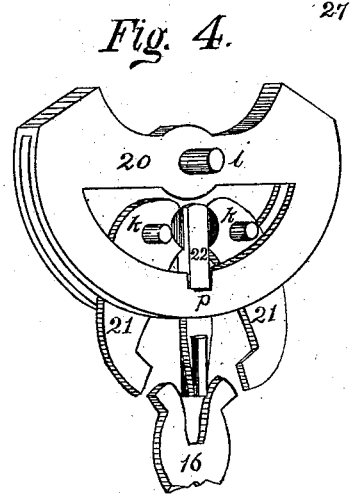

Referring to the accompanying drawings embodied in three sheets, and in which similar letters of reference indicate like parts in each of the several figures, Figure 1 is a perspective view of the machine, showing in general the relations of its several parts. Fig. 2 is an interior view of one of two bed-plates which form the bed for the fork-operating mechanism. Fig. 3 is a perspective view of said fork-operating mechanism detached from but adapted to work between said bed-plates. Fig. 4 is a perspective view of a device adapted, when arranged in connection with elements hereinafter described, to hold the carrier in a stationary position upon the track while the forks, filled with hay, are being elevated from the load to a point at or near the track. When the forks, full of hay, arrive at said point, a pulley-block of peculiar construction, and by means of which said hay is elevated, engages with said carrier-holding mechanism and releases the said carrier from its stationary position, so that a continuance of strain upon the elevating-rope causes the carrier to move along the track and carry the said fork, full of hay, to the place of discharge in the barn. Said mechanism, (shown in said Fig. 4,) when in combination with the bed plate or plates between which it lies, (the whole forming the carrier or carriage,) not only holds or locks said carriage in a fixed position on the track, but performs the further function of grasping the said pulley-block and preventing the same from descending as the unlocked carrier moves rapidly along on the track. Fig. 5 is a detail view of a portion of the carrier. Fig. 5½, Sheet 2, is an interior face view of a plate forming one of the sides of the carrier, the same showing clearly the conformation thereof, whereby it is adapted to receive and operate in conjunction with the mechanism illustrated in Fig. 4. Fig. 6 illustrates said plate in combination with a certain rotating locking portion, the location of certain other attending portions being indicated in outline, the position of the parts being as shown when the forkful of hay has been raised, the rotating portion unlocked, the pulley-block grasped, and the carriage is about passing from its stationary position on the track. Fig. 7 illustrates the said pulley-block, having diverging arms so formed as that the latter may be grasped and at the same time throw up a sliding latch-bar, whereby the rotating locking portion is unlocked. The said pulley-arms being grasped, as before mentioned, the pulley and its connections are held into connection with the carriage while the latter is traveling on the track to and from the place of discharge of the hay. Fig. 8 is a detail side elevation of a latch-bar, the function of which will be hereinafter set forth. Fig. 9 is an elevation showing more clearly the arrangement of parts of the fork-operating mechanism in connection with one of the bed-plates between which said mechanism lies. The parts are in the relation shown in this figure when the fork is in position to hold the hay, as in Fig. 1. Fig. 10 shows the same said parts when the fork-tines are separate to release the hay. Said figure also illustrates the ends of certain bars or rods which connect the operating mechanism to the fork. Fig. 11 is a side elevation, showing in detail the fork-tines and the head carrying the same, which illustrates more clearly the relation of the latter with the said diverging bars.

In said drawings, 19, Fig. 1, is a track or way, formed preferably of parallel strips, between which the carriage 17 travels, said carriage being provided with wheels or rollers, preferably flanged. Said track or way is suspended from the rafters or other suitable supports, preferably by arched pieces 23, sufficiently enlarged to allow the passage of said carriage thereunder. The arched piece nearest to where it is intended that the carriage shall rest during the process of elevating the hay to the carriage and the lowering of the empty forks is provided with a cross-bar, $m$, Figs. 1 and 6, arranged therein at a point where it will strike a projecting portion, 34, of a locking-piece, 20, in the carriage.

Under certain circumstances I may substitute for the cross-bar a block or other portion, which may be secured to the rafters or other convenient place.

The carriage 17 comprises a bed formed preferably of two plates, which may be bolted together by bolts $g$, thus forming a chamber, into which is secured the before-mentioned rotating locking-piece 20 and other hereinafter-described locking and grasping mechanisms. The interior walls of said bed-plate are formed as shown more clearly in Fig. 5½, 30 being a curved slot or depression in the bed-plate, adapted to receive the rotating locking-piece 20, and 31 vertical slots adapted to receive and guide a latch-bar, 22, Figs. 4, 6, and 8. Said bed-plates have the track-rollers $h$ and pulleys 18 pivoted thereon, as shown, the former being on the outside of the plates and the latter between the same, as will be clearly understood. Rigid guides 32 are formed on the plates, which prevent the elevating-rope $r$ from passing from the periphery of the pulley, the lower extremities of the ridges 33 also serving to guide the diverging arms 16 of the pulley-block 15 into proper engagement with the latch-bar.

When the operator commences operations the carriage is in a stationary position upon the track beneath the arched piece 23, provided with the cross-bar $m$, as shown in Fig. 1, the points 34 of the rotating piece 20, both projecting about equally above the level of the bar, and thus preventing any material lateral movement of the carriage. When the said rotating piece 20, which has formed thereon the semicircular portion 37, is in the position above indicated, a vertically-sliding latch-bar, 22, lies into engagement with a notch, $p$, in the semicircular portion 37 and prevents the rotation of the same, as will be clearly evident upon reference to Figs. 4, 5½, and 6. Said sliding latch-bar 22 is provided with projections 34 and 35, Fig. 8, which work in the grooves 31. Said projections 34 35 form recesses 36, in which the semicircular portions 37 of the rotating piece 20 work, as will be apparent upon reference to Fig. 4. The weight of the part 22 causes the hooked ends of the portions 21, which work on the pivots $k$, to lie separated, as will be seen upon reference to Fig. 4. When the elevating-rope $r$ brings the arms 16 of the pulley-block 15 into engagement with the lower extremity of the latch 22 the latter is forced up out of engagement with the notch $p$ in the semicircular portion 37, freeing the same and simultaneously causing the hooks 21 to come together to grasp the arms 16. The strain on the rope $r$ being continued, the carriage, as a whole, moves on the wheels $h$ over the track 19 in the direction of said strain. One of the points, 34, of the rotating piece engages with the cross-bar $m$; but the said rotating piece being unlocked, the same revolves on its axis $i$ and allows the carriage free progress on the track until the load of hay arrives at the desired destination in the barn, when the trip-rope is pulled and the hay dropped. When the horse is turned around and the tension on the rope $r$ removed, the weight 27 operates automatically to bring the carriage back to its former position, when the cross-bar $m$ repasses over the depressed point 34 of the rotating piece 20 and strikes the opposite elevated point, (shown in Fig. 6,) depressing the same until the notch $p$ is brought under the latch 22, when the latter, by its own weight, falls automatically into said notch and holds or locks the rotating piece. The point 34 last depressed is not, however, sufficiently so depressed as to allow the further passage of the carriage, as will be evident. At the moment the carriage is locked the hooks 21, influenced by the falling latch, are separated, so that the fork is allowed to fall upon the load of hay. The carriage may be drawn back from the discharging-point automatically by the weight 27; or the same end may be accomplished by the operator pulling on the trip or discharge rope. It is evident that by simply pulling the elevating-rope $r$ (both ends of which are provided with knots 28 or other means—such as a ring—whereby the said ends are prevented from passing through the eyes 29) through the carriage, so that the knot or ring on the opposite end of the elevating-rope engages with the opposite eye in the carriage, the latter may be drawn in an opposite direction on the track to another part of the barn—a feature of improvement, as it overcomes the necessity of the operator climbing to the track and reversing the carriage thereupon at a great expense of labor and time. This construction allows both ends of the rope to be used to an equal extent, whereby the wear thereon may be equalized.

Beneath the carrier 17 is arranged the pulley-block 15, Figs. 1 and 7, having therein the pulley 38. Said pulley-block is carried by the elevating-rope $r$, as will be apparent.

To the under portion of the block is arranged a swivel-eye, 39, which, in connection with a rod, 24, on the track, enables the device as a whole to be carried to the other end of the barn and be operated from the floor, as will be hereinafter described. From said swivel-eye on the block is suspended the fork-operating mechanism, which consists in bed-plates 1, (which may be bolted together by bolts 2 2 2 2,) having therein the vertical slots $d$, horizontal slots $b$, and diverging slots $f$, which said slots give direction to the mechanism carried between said plates. Said mechanism is, first, a trip-lever, 3, having a circular portion thereto, which is peripherally slotted, as clearly shown in Fig. 3. Through said slots is arranged a sliding plate, 4, having a vertical slot, 40, Figs. 9 and 10, and laterally-projecting pins $c$, formed on the upper extremity. The lower extremity of said sliding plate 4 has pivoted thereto the connecting-bars 5 5, which are provided with laterally-projecting pins $e$, which work in the diverging slots $f$.

The circular portion of the trip-lever is provided with laterally projecting pins $a$, which work in the horizontal grooves $b$, and the vertically sliding plate 4 is provided with the pins $s$, which engage with the inner edge of the circular portion of the trip-lever.

When the outer extremity of the trip-lever is raised by the trip-rope (the pin $a$ acting as the fulcrum) the sliding plate 4, working in the vertical groove $d$ and on the central guide-bolt 2, is raised, and the connecting-bars 5, working in the diverging slots, are brought upward into vertical position, as will be readily understood upon reference to Fig. 9.

In raising the lever 3 the fulcrum-pin $a$ remains stationary in the slot $b$ until the periphery of the circular portion strikes the lug, pin, or shoulder 41, Figs. 1, 9, 10, at which time the fulcrum pin $a$ slides horizontally in the slot $b$ until it arrives at the opposite end at which the pin $a$ will have passed the center of gravity—the pin $s$—as shown in Fig. 9, and the trip-lever remain automatically at rest. At this stage the fork is closed, as shown in Fig. 1.

When the fork is about to be filled with hay the operator draws the tines 10 apart, (using the handles in the process,) as indicated in Fig. 11, where one side of the fork is shown, and thrusts the same into the hay. The horse draws upon the elevating-rope and causes the fork to close automatically, which operation causes the operating mechanism to come to the position above described, and as illustrated in Fig. 9. At this position any strain upon the trip-rope from the direction of the pulley will have no effect upon the trip-lever, as said strain would only tend to keep the same past the before-mentioned center of gravity, as shown in Fig. 9.

When the pulley draws the fork-operating mechanism up to the carriage it will be evident that the direction of strain upon the lever will have been materially changed, so that by pulling upon the trip-rope the lever is brought back across the center of gravity, thus allowing the said lever to fall, and with it the sliding bar 4. This action causes the bars 5, guided by the diverging slots $f$, to separate, the fork-tines to open, and the hay to fall to the mow. It will be understood, however, that this action need not, and indeed would not, be performed until the horse had drawn the carriage along to the mow. Upon the bed-plates 1 of the fork-operating mechanism are bolted the bars 6, which connect said plates with the heads of the forks, as shown clearly in Fig. 1, and also in Figs. 10 and 11.

To the sliding bars 5 5 are connected a draft-bar, 12, which is also connected to the head 9 of the fork. The said bars 6 and 12 are pivoted to the fork-head 9 on differential centers, producing a certain amount of leverage, and so that when bars 5 are caused to rise the bars 6 will be operated upon to draw the tines together. In this case the fork is the weight or resistance, the lower pivotal extremity of the bars 12 the fulcrum, and the bars 6 the actuating-power, all as will be understood upon reference to Figs. 1, 10, and 11.

After having filled one end of the barn with hay it becomes necessary to so reverse the mechanism as that the other end or portion may be filled. To do so I first draw the elevating-rope $r$ through the carriage, as before described, then by means of a pole or other suitable means throw the pulley 25 from one of the hooks or pockets in the rod 24 across to the opposite pocket. The swivel-eye in the block 15 allows the lower-fork mechanism to be turned so that no twists or entanglements will occur. The device will then be ready for operation, as hereinbefore described. In this case the weight 27 may be dispensed with and the trip-rope made to subserve the purpose as hereinbefore provided.

It will be evident that a number of changes may be made in the construction without departing from the spirit of my invention.

Having thus described my invention, what I claim, and wish to secure by Letters Patent, is—

1. In combination, in a device for elevating and carrying hay, the carriage bed-plates 17, a rotating piece, 20, having projections 34 and a notch, $p$, the hooked portions 21, and the sliding latch 22, all arranged and operating substantially as and for the purposes herein set forth and shown.

2. In combination with the carriage bed-plates 17, the rotating piece 20, having the notched semicircular portion 37 and the elevated points 34, the grasping-pieces 21, and a latch-bar, 22, all arranged and operating substantially as and for the purposes herein set forth and shown.

3. The combination, with the carriage adapted to roll on the track 19, and a cross bar or portion, $m$, permanently arranged at a point above said track, of a rotating portion, 20, adapted to engage with said portion $m$ and lock the carriage in its passage thereunder, substantially as herein set forth.

4. In combination, the carriage bed-plates 17, the locking and grasping mechanism, the block 15, having the pulley 33 and portions 16, adapted to be grasped, the elevating-rope $r$, fork-operating mechanism suspended from said pulley-block and said fork, all said parts being arranged and operating substantially as herein set forth and shown.

5. In a device for elevating and distributing hay, grain, &c., the rod 24, secured to the track or other suitable support, and having pockets at each end thereof, the swivel-eyed pulley 15, the trip-rope, and the pulley 25, in combination with the carriage 17 and fork-operating mechanism, all said parts being arranged and operating substantially as herein set forth.

6. In combination, the bed-plates 1 of the fork-operating mechanism, having the shoulders 41, the trip-lever 3, having the sliding fulcrum-pin $a$, and having a curved inner edge to engage with the pins $s$, the vertically-sliding plate having said pins $s$, the connecting-bars 5, working in diverging slots, and rods or bars 6 and 12, adapted to operate the fork, the whole being arranged and operating substantially as set forth and shown.

7. The block 15, pulley 38, and arms 16, in combination with the carriage containing grasping mechanism and the elevating-rope $r$, substantially as herein set forth and shown.

8. The block 15, pulley 38, and arms 16, in combination with the carriage 17, containing grasping mechanism, and a latch adapted to engage with said pulley-block to unlock the carriage, all substantially as herein set forth.

9. In combination, the car-frame 17, in combination with the notched semicircular rotating portion 20, the grasping-hooks 21, and the latch-bar 22, all arranged and operating substantially as herein set forth.

10. The rod 24, having hooks or pockets at each end, in combination with the trip-rope pulley 25, the whole being arranged and operating substantially as and for the purposes set forth.

11. The combination, with the fork, of fork-operating mechanism working in a bed suspended from the pulley 15, said bed having the bars 6 pivoted thereto, and said fork-operating mechanism actuating the rod 12, all substantially as herein set forth and shown.

12. The two fork-tines 10, connected by a cross-piece having a central elbow formed thereon, the whole being formed of one piece of metal, and connected with fork-operating mechanism, substantially as set forth.

13. The head 9, in combination with the tines 10, formed in one piece with the centrally-shouldered cross-piece, said head and cross-piece being riveted or bolted together, substantially as set forth and shown.

14. The combination, with the bed-plates 1 of the fork-operating mechanism, having the shoulder 41, vertical slot $d$, horizontal slot $b$, and diverging slots $f$ therein and thereon, of the trip-lever 3, having the fulcrum-pins $a$, working in said horizontal slot, the sliding plate 4, having the pin $c$, working in the vertical slot $d$, and the pin $s$, adapted to engage with the trip-lever, whereby the sliding plate is raised, and the connecting-rods 5, having the bars 12, pivoted thereto, and having pins $e$, working in said diverging slots, all said parts being arranged and operating substantially as herein set forth and shown.

15. The combination, with the carriage bed-plates 17, having the track-wheels $h$ and pulleys 18 pivoted thereon, and having eyes 29 formed therein for the reception of the rope $r$, of the rotating semicircular plate 20, having projections 34, and semicircular portion 37, having the inner edge thereof notched, as at $p$, the plate 22, sliding in grooves in the bed-plate, and having projections 34 adapted to engage with the before-mentioned notch $p$, whereby the rotating piece 20 is locked, and grasping-hooks 21, actuated by said sliding plate, all substantially as set forth and shown.

JOHN FARRELL.

Witnesses:
FRANK L. INGERSOLL,
ANDREW H. KONKLE.